J. E. Parker,
Reversible Latch.

No. 77,650.      Patented May 5, 1868.

Witnesses:

Inventor:
John E. Parker
By his Attorney

United States Patent Office.

JOHN E. PARKER, OF MERIDEN, CONNECTICUT.

Letters Patent No. 77,650, dated May 5, 1868.

---

IMPROVEMENT IN REVERSIBLE KNOB-LATCHES.

---

*The Schedule referred to in these Letters Patent and making part of the same.*

---

TO ALL WHOM IT MAY CONCERN:

Be it known that I, JOHN E. PARKER, of Meriden, in the county of New Haven, and State of Connecticut, have invented a new Improvement in Knob-Latches; and I do hereby declare the following, when taken in connection with the accompanying drawings, and the letters of reference marked thereon, to be a full, clear, and exact description of the same, and which said drawings constitute part of this specification, and represent, in—

Figure 1:
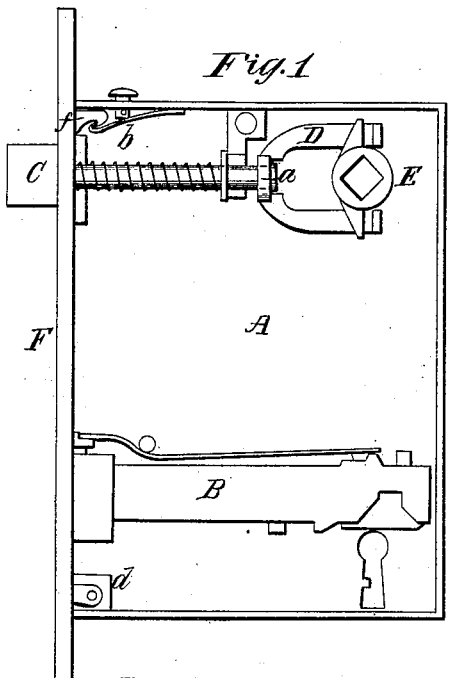
Figure 2:
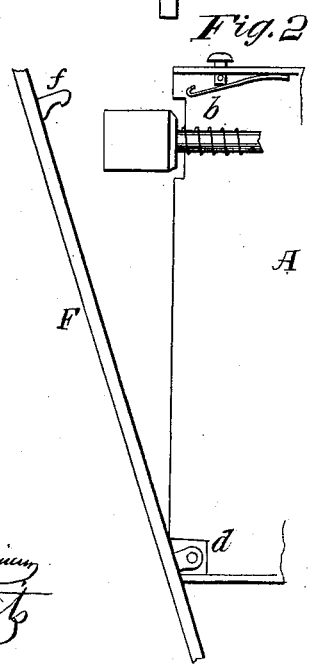

Figure 1, a side view of the latch-case, the plate removed to show the interior, and in Figure 2 a partial view of the same illustrating the operation.

This invention relates to an improvement in knob-latches, the object being to make the latch-bolt reversible, so as to serve either for a right or left-hand door; and the invention consists in hinging the lock-case to the face-plate, so that the said face-plate may be turned from the case sufficiently to withdraw it from the latch-bolt, and when so turned away the latch-bolt may be set for either a right or left-hand position, the face-plate returned and secured to the case by any convenient arrangement, so as to retain the latch-bolt in that position.

In order to the clear understanding of my invention, I will fully describe the same as illustrated in the accompanying drawings.

A is the lock-case; B, the lock-bolt; C, the latch-bolt; D, the yoke; and E, the follower, all constructed and arranged in the usual manner, save that the tail of the latch-bolt is attached to the yoke so as to be free in a bearing, $a$, to be revolved in the said bearing. F, the face-plate, is hinged to the case A at or near the point $d$, and at its upper or opposite end is provided with a catch, $f$, and a spring-latch, $b$, arranged in or upon the case, so that when the face-plate is pressed up to the position in fig. 1 it will be caught and held by the spring upon the one, and the catch upon the other, and when in the position in fig. 1, the latch-bolt is held in position and operated in the usual manner of knob-latches.

If desired to reverse the latch-bolt, that is, to change from right to left, or *vice versa*, relieve the face-plate F from the latch by depressing the spring $d$; then turn the face-plate from the case, as in fig. 2, which leaves the latch-bolt free, when it may be set in either desired position, and when so set return the face-plate, as seen in fig. 1.

Having described my invention, what I claim as new and useful, and desire to secure by Letters Patent, is—

Hinging the face-plate to the lock-case, so as to be turned therefrom, substantially in the manner and for the purpose herein set forth and described.

JOHN E. PARKER.

Witnesses:
  A. J. TIBBITS,
  J. H. SHUMWAY.